Aug. 17, 1943.         R. M. SMITH         2,327,292
PROTECTIVE RELAY SYSTEM
Filed June 21, 1940
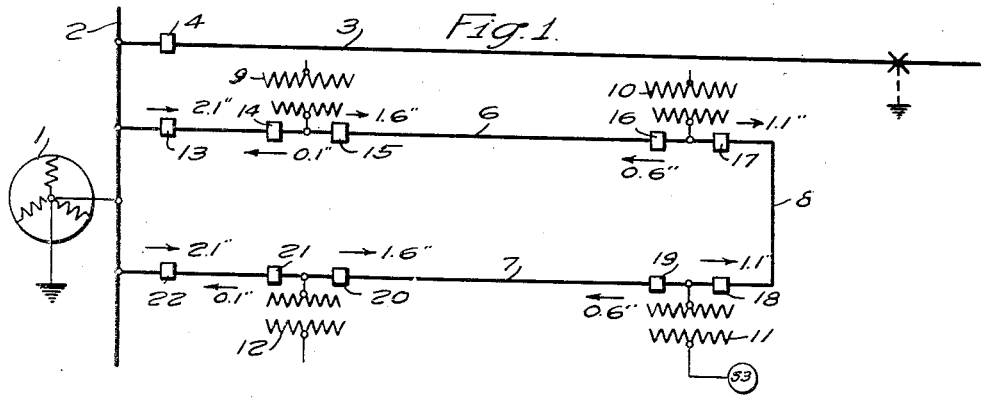
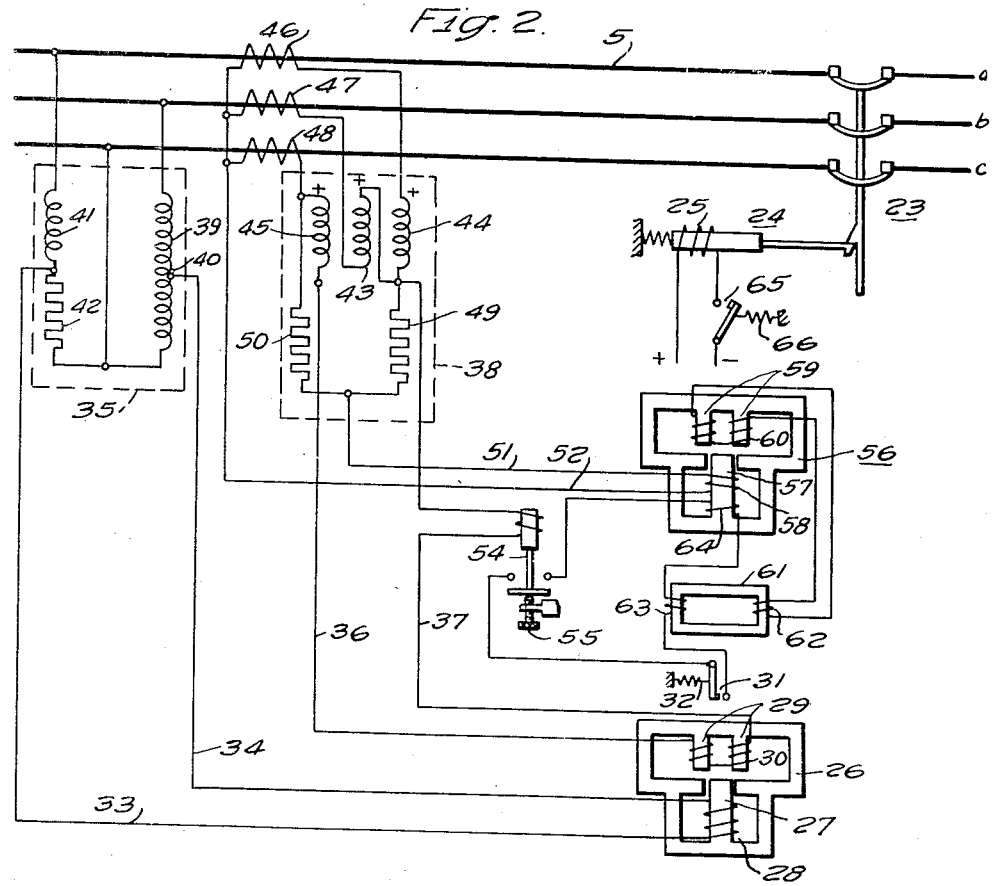
WITNESSES:
E. A. McCloskey
C. L. Freedman
INVENTOR
Roy M. Smith
BY
ATTORNEY Patented Aug. 17, 1943

2,327,292

UNITED STATES PATENT OFFICE 2,327,292

PROTECTIVE RELAY SYSTEM

Roy M. Smith, Livingston, N. J., assignor to Westinghouse Electric & Manufacturing Company, East Pittsburgh, Pa., a corporation of Pennsylvania Application June 21, 1940, Serial No. 341,609

7 Claims. (Cl. 175—294)

This invention relates to electrical protective systems and it has particular relation to systems for protecting a polyphase electrical circuit against ground faults occurring therein.

In protecting electrical circuits, it is common practice to employ directional ground current relays. When properly installed, such relays adequately protect the system against ground faults occurring therein and serve to isolate the portion adjacent the ground from the remainder of the system. Occasionally, however, such ground current relays have been found to operate incorrectly and no satisfactory explanation of the incorrect operation could be given.

In treating polyphase alternating current systems, it is convenient to analyze a system in terms of sequence quantities, as explained in the book on "Symmetrical Components" by C. M. Wagner and R. D. Evans, published in 1933 by McGraw-Hill Book Company, New York city. According to "Symmetrical Components" an unbalanced polyphase system of currents may be represented by three symmetrical systems of currents. These symmetrical systems include a positive phase sequence or positive sequence component, a negative phase sequence or negative sequence component, and a zero phase sequence or zero sequence component. The directional ground current relays above referred to are responsive to zero sequence currents.

Because of space limitations and economy, it is often desirable to locate circuits adjacent to each other. For example, two independent circuits may be mounted upon common transmission towers. Under such conditions I have found that, if a first polyphase circuit offers a path for zero sequence current, substantial zero sequence current will be induced therein when a zero sequence current flows in the second circuit. If conventional directional ground current relays are employed in the first circuit, they may be actuated by the induced zero sequence current despite the fact that no ground fault is present on the first circuit. This explains many of the incorrect operations of directional ground current relays above referred to.

In accordance with this invention, conventional directional ground current relays for circuits subject to zero sequence induced currents are replaced by directional negative sequence relays. When a fault occurs from a phase conductor to ground on a grounded neutral polyphase system, not only does substantial zero sequence current flow, but the resulting unbalance of the system produces a substantial amount of negative sequence current. In accordance with standard practice, the negative sequence current may be treated as originating at the fault as a source and flowing in the system away from the fault. The presence of this current permits the utilization of negative sequence relays.

By employing negative sequence current for energizing the directional relays, substantially all trouble from induced current is eliminated. For example, in a three-phase system, the negative sequence currents may be represented by three equal and symmetrical vectors displaced from each other by 120°. Because of the balance of these vectors, substantially no negative sequence current is induced in a circuit adjacent the three-phase circuit. This is particularly true because of the practice of transposing the phase conductors of distribution circuits at frequent intervals in order to minimize unbalances between adjacent circuits resulting from mutual inductance. Since substantially no negative sequence current is transferred to a circuit by mutual induction, it follows that incorrect relay operation cannot be obtained from induced negative sequence current. Moreover, since these relays are not responsive to zero sequence current, the presence of induced zero sequence current has no effect thereon.

The directional negative sequence relay may be employed for controlling the energization of a time delay relay which is suitably energized as by zero sequence current, or the zero sequence relay may be employed for rendering the negative sequence relay effective.

For some circuits it is desirable to discriminate between negative sequence current produced by internal and external faults. For example, in a polyphase loop circuit, if apparatus capable of supplying negative sequence current is energized from the loop circuit, a fault occurring external to the loop circuit may result in the flow of sufficient negative sequence current to operate the negative sequence relays. However, under these circumstances the magnitude of the negative sequence current would be substantially less than that flowing in the loop circuit in response to a fault occurring in the loop circuit. For this reason a negative sequence overcurrent relay may be employed for preventing energization of the zero sequence relay or for otherwise inhibiting operation of the mechanism controlled by the directional relay unless the negative sequence current exceeds the values present for external faults. The provision of a separate overcurrent relay generally is preferable to the provision of a similar control in the directional relay itself.

It is accordingly an object of this invention to provide a circuit subject to zero sequence induced current with ground fault protective means which is not subject to the induced current.

It is a further object of the invention to provide a circuit subject to zero phase induced current with negative sequence directional relays for protecting the circuit against ground faults.

It is a still further object of this invention to provide a loop circuit subject to zero sequence induced current with a negative sequence directional relay responsive to ground faults occurring only within the loop circuit.

Still another object of this invention is to provide a circuit subject to zero sequence induced current with ground fault protective means responsive to the direction of negative sequence current, the magnitude of negative sequence current and the magnitude of zero sequence current in said circuit.

Other objects of the invention will be apparent from the following description taken in conjunction with the accompanying drawing, in which:

Figure 1 is a diagrammatic single-line view showing a polyphase distribution system, and Fig. 2 is a diagrammatic view showing a relay system embodying this invention.

Referring to the drawing, Fig. 1 shows in single line a three-phase distribution system energized from a grounded neutral source such as a star connected three-phase generator 1. The generator 1 is connected to a bus 2 which supplies energy to a radial feeder circuit 3 through a suitable protector 4 and to a loop feeder circuit 5 having a leg 6, a leg 7 and a tie portion 8.

At suitable intervals around the loop circuit 5 transformers 9, 10, 11 and 12 are provided for transmitting energy from the loop circuit to secondary distribution circuits, or to consumers.

When a ground fault occurs on a portion of the loop circuit 5, it is desirable that only the faulted portion of the loop circuit be removed from service so that energy may be continuously supplied over the sound portions of the loop circuit. For this purpose, suitable protectors 13 to 22 are provided for the loop circuit. Each of the protectors may include a circuit breaker and a directional time delay relay for controlling the tripping of the circuit breaker. Adjacent each of the protectors in Fig. 1, an arrow indicates the direction of current flow for which the protector trips and a number adjacent the arrow indicates the time delay in seconds required before the protector trips. It is to be understood that the specific protector arrangement and time delays are employed merely in an illustrative manner and may vary widely in accordance with the requirements for each distribution system.

It will be noted in Fig. 1 that the leg 6 of the loop circuit is adjacent the radial feeder circuit 3 for a substantial portion of its length. For example, the leg 6 and the feeder circuit 3 may be mounted on common transmission towers. With circuits so close to each other substantial mutual induction may exist between the circuits. Because of this mutual induction a current flowing in one of the circuits under certain conditions may result in the flow of an induced current in the other circuit.

Let it be assumed that a ground fault occurs on a phase conductor of the feeder circuit 3 at a point X. As a result of this fault a substantial zero sequence current flows in the feeder circuit 3. Zero sequence currents flowing in the three-phase conductors of a three-phase circuit are in phase with each other. Consequently the effects of such zero sequence currents in mutual induction are cumulative. For this reason the zero sequence currents flowing in the feeder circuit 3 have substantial flux linkages with the leg 6 of the loop circuit 5.

It will be noted that the loop circuit 5 consists of a completely closed electrical circuit. As a result of the flux linkages between the feeder circuit 3 and the leg 6, a substantial zero sequence current flows in the closed loop circuit.

Regardless of its direction of flow a zero sequence current induced in the loop circuit 5 tends to actuate at least half of the protectors associated with the loop circuit. Depending on the duration of the flow of such current one or more of the protectors may trip to disconnect portions of the loop circuit.

Tripping of loop circuit protectors under such conditions is highly objectionable. Since the loop circuit is free from any fault and is in a sound condition, there is no necessity for tripping any of its protectors. Such tripping results in an unnecessary disturbance of the distribution system and may disrupt the continuity of service to one or more secondary distribution circuits. If the protectors associated with the loop circuit 5 are not responsive to zero sequence current, this objectionable tripping is prevented.

In accordance with this invention each of the protectors associated with the loop circuit is provided with directional tripping means responsive to negative sequence quantities. A suitable protector of this type is illustrated diagrammatically in Fig. 2.

In Fig. 2 a protector is illustrated which includes a circuit breaker 23 having a tripping solenoid 24 and a trip coil 25 associated therewith. Energization of the trip coil 25 is controlled by a relay assembly which includes a relay 26 of the conventional induction disk type. The relay 26 comprises a potential pole 27 having a potential winding 28 associated therewith. In addition, the relay 26 includes current poles 29 having current windings 30 associated therewith. When the current and potential windings are properly energized, a shifting magnetic field is produced in the air gap between the poles. An induction disk (not shown) mounted for rotation in this air gap is rotated by the shifting magnetic field to close contacts 31 associated therewith and normally biased in an open condition by means of a suitable spring 32. The construction of the portion of the relay 26 thus far described is well known in the art.

In accordance with this invention the potential winding 28 is energized in accordance with the negative sequence voltage in the loop circuit 5 and the current windings 30 are energized in accordance with the negative sequence current flowing in the loop circuit 5. To this end the potential winding 28 is connected through suitable conductors 33 and 34 to the output terminals of a negative sequence potential filter 35. The current windings 30 are connected through suitable conductors 36 and 37 to the output terminals of a suitable negative sequence current filter 38.

The potential filter 35 conveniently may be of the type illustrated in the Lenehan Patent 1,936,797 which is assigned to the Westinghouse Electric & Manufacturing Company. Briefly, this potential filter includes an auto-transformer 39 having a 40% tap 40, an inductance 41 and a resistance 42. The inductance 41 and the resistance 42 are so proportioned that the voltage drop across the resistance is approximately 40% of the resultant voltage drop across the inductance and the resistance in series and lags the resultant voltage drop by 60°. With the parts connected as shown in Fig. 2 and the phase rotation A, B, C, the output of the potential filter 35 is proportional to the negative sequence potential of the loop circuit 5. Further details of the potential filter 35 may be found by reference to the aforesaid Lenehan patent.

The current filter 38 may be of the type disclosed in the Lenehan Patent 2,161,829 which is assigned to the Westinghouse Electric & Manufacturing Company. This filter includes a mutual reactor comprising two primary windings 43 and 44 and a common secondary winding 45. Each of these windings has one terminal connected to a separate terminal of star connected current transformers 46, 47 and 48. The free ends of the primary windings 43 and 44 are connected together to one terminal of a resistance 49. A second resistance 50 has one terminal connected to that terminal of the current transformer 48 which also is connected to the secondary winding 45. As illustrated in Fig. 2, the free terminals of the resistors 49 and 50 are connected in parallel through conductors 51 and 52 to the neutral of the star connected current transformers. The polarity markings of the reactor windings are indicated by crosses. If the resistance 49 has a value $$\frac{R}{3}$$

the resistance 50 has a value $$\frac{2R}{3}$$

and the neutral impedance between each of the primary windings and the secondary winding 45 is equal to $$\frac{jR}{\sqrt{3}}$$

the filter 38 connected, as shown, will deliver an output to the conductors 36 and 37 which is proportional to negative sequence current flowing in the loop circuit 5. Further details of the circuit filter 38 will be found in the last mentioned Lenehan patent.

Since the relay 26 is essentially a watt responsive relay, the direction of rotation of its armature disk is responsive to the direction of flow of negative sequence current in the loop circuit. Consequently the contacts 31 will close only when the direction of flow of negative sequence current is in the direction for which the relay 26 is adjusted.

It is desirable that the relay 26 be a sensitive relay. For example, under some conditions the relay 26 may be energized by a substantial negative sequence current when only a small negative sequence potential is available for energizing the potential winding 28. In order to respond satisfactorily under such conditions, the relay 26 should have a sensitive setting.

On some distribution systems having a loop circuit the sensitive setting of the relay 26 may result in closure of the contacts 31 when a fault occurs on the system external to the loop circuit with which the relay is associated. Referring to Fig. 1 let it be assumed that apparatus 53 capable of supporting the flow of a negative sequence current is associated with one of the secondary distribution circuits such as that associated with the transformer 11. For example, the apparatus 53 may be a synchronous motor. When a ground fault occurs at the point X, negative sequence current will flow through the loop circuit 5 because of the presence of the apparatus 53. Such current may be sufficient to actuate the sensitive relays 26.

It may be possible to prevent operation of the relays 26 under these circumstances by reducing their sensitivities but this solution is objectionable for reasons previously set forth. In accordance with another solution, a separate negative sequence overcurrent relay 54 may be associated with the directional relay 26. As illustrated, the overcurrent relay 54 is of the simple solenoid type. Other forms of overcurrent relays may be substituted therefor. Energization for the relay 54 may be provided by connecting the relay 54 in series with the windings 30 for energization from the current filter 38. When the negative sequence current exceeds a predetermined value, the relay 54 picks up to close its front contacts.

The current value at which the relay 54 closes its contacts preferably is adjustable. Any suitable adjustment for the relay 54 may be provided. As illustrated, an adjusting screw 55 is positioned below the relay to control the deenergized position of the relay solenoid.

It will be noted that the contacts of the relay 54 are in series with the contacts of the relay 26. Consequently a control action is possible only when the contacts of both relays are closed.

Although the contacts of the relay 26 alone, or the contacts of the relays 54 and 26 connected in series may be employed for certain control operations, it is possible that these relays may close when no ground fault occurs on the loop circuit 5. To prevent tripping of the circuit breaker 23 under these conditions an additional relay 56 is provided for energization in accordance with zero sequence current flowing in the loop circuit 5.

Although the relay 56 may take various forms, it is illustrated as an overcurrent relay of the familiar induction disk type. This relay includes a main pole 57 provided with an energizing winding 58 and auxiliary poles 59 provided with auxiliary windings 60. The auxiliary windings are connected for energization in accordance with the energization of the energizing winding 58 through a torque compensator transformer 61. The auxiliary windings 60 are connected to a secondary winding 62 on the transformer 61. The transformer 61 has a primary winding 63 which is connected for energization from a winding 64 which is also mounted on the pole 57 in inductive relationship relative to the energizing winding 58.

It will be noted that the energizing circuit for the primary winding 63 is completed through the contacts of the relays 26 and 54. Consequently the auxiliary windings 60 are effective to produce a shifting magnetic field for the relay 56 only when the contacts of both of the relays 26 and 54 are closed.

Current proportional to the zero sequence current flowing in the loop circuit 5 may be applied to the energizing winding 58 in any manner as by including the winding in the neutral connection of the star connected current transformers 46, 47 and 48. In Fig. 2 this is illustrated by the attachment of the conductors 51 and 52 to the energizing winding.

When the relay 56 is properly energized, an armature associated therewith is actuated to close contacts 65 carried by the relay against the resistance of a biasing spring 66. The relay 56 may be provided with a time delay for furnishing the time delay desired for each protector of the loop circuit 5. Closure of the contacts 65 may be employed for any control operation. For example, closure of the contacts may connect the winding 25 to a source of direct current for tripping the circuit breaker 23.

Three conditions must be fulfilled before the contacts 65 can close. First, the direction of flow of negative sequence current in the loop circuit 5 must be in the proper direction for actuating the relay 26 to close its contacts; second, the magnitude of the negative sequence current flowing in the loop circuit 5 must be sufficient to actuate the relay 54 to close its contacts; and third sufficient zero sequence current must flow in the loop circuit 5 for the time necessary for actuating the relay 56 to close its contacts.

It is believed that the operation of the system thus far described is apparent. If a ground fault occurs on the feeder circuit 3, such as at the point X, substantial zero sequence current is induced in the loop circuit 5. However, since the relay 26 is not responsive to zero sequence current, such current does not actuate the protectors of the loop circuit 5.

If a source capable of supporting negative sequence current is associated with the loop circuit some negative sequence current may flow in the loop circuit but the magnitude of such current will be relatively small. This is for the reasons that negative sequence currents flowing through external faults must divide between the parallel paths offered by the loop circuit. Moreover, the impedance offered to such negative sequence current generally is greater than that offered to negative sequence current flowing to internal faults. In addition, the capacity of the source 1 generally is substantially greater than that of any apparatus associated with the secondary distribution circuits and tends to support greater negative sequence current for an internal fault than does the apparatus for a fault external to the loop circuit. These magnitudes of negative sequence current are discussed with reference to the current flowing in the loop circuit 5 alone.

Since the negative sequence current resulting from a fault external to the loop is relatively small, the relay 54 is not actuated to close its contacts and the circuit breaker 23 fails to trip.

If the protector 4 is responsive to conditions created by the fault on the feeder circuit 3, it will operate to disconnect the feeder circuit from the bus 2, and no impairment whatever of the service offered by the loop circuit 5 results.

If an internal ground fault occurs on the loop circuit, the direction of flow of negative sequence current is such that certain of the relays 26 associated with the loop circuit are actuated to close their contacts 31. Also since the negative sequence current is of a relatively large magnitude, the relays 54 pick up to close their contacts. Consequently each of the zero sequence relays 56 is placed in an effective condition by closure of the associated contacts of the relays 54 and 26. At the expiration of the time delay for which the relay 56 is set, the contacts 65 close to trip the circuit breaker 23. Because of the selective action afforded by the varying time delays only those circuit breakers adjacent the fault trip.

Although the invention has been described with reference to certain specific embodiments thereof, the invention is capable of numerous modifications. Therefore, the invention is not to be restricted except as required by the appended claims when interpreted in view of the prior art.

I claim as my invention:

1. An alternating current system comprising a polyphase loop circuit, a circuit adjacent said polyphase loop circuit and effective under certain conditions for inducing a substantial zero phase-sequence quantity in said polyphase loop circuit, switch means for operatively connecting and disconnecting portions of said system, control means for said switch means comprising a directional element responsive only to negative phase-sequence current in said polyphase loop circuit, and auxiliary means responsive to a zero phase-sequence quantity present in said polyphase loop circuit, said control means being effective for operating said switch means only when both said directional means and said auxiliary means are in predetermined conditions.

2. An alternating current system comprising a polyphase loop circuit, a circuit adjacent said polyphase loop circuit and effective under certain conditions for inducing a substantial zero phase-sequence quantity in said polyphase loop circuit, switch means for operatively connecting and disconnecting portions of said system, and control means for said switch means comprising a directional element responsive only to the negative phase-sequence component of current in said polyphase loop circuit, said control means including means for discriminating between a negative phase-sequence current supported by means external to said polyphase loop circuit and a negative phase-sequence current supported by means associated with a branch of said polyphase loop circuit.

3. An alternating current system comprising a polyphase loop circuit, a circuit adjacent said polyphase loop circuit and effective under certain conditions for inducing a substantial zero phase-sequence quantity in said polyphase loop circuit, switch means for operatively connecting and disconnecting portions of said system and control means for said switch means comprising a directional element responsive only to the direction of flow of negative phase-sequence current in said polyphase loop circuit, auxiliary means responsive to a zero phase-sequence quantity present in said polyphase loop circuit, said control means being effective for operating said switch means only when both said directional means and said auxiliary means are in predetermined conditions; and adjustable means for rendering said control means effective for operating said switch means only for an adustable range of magnitude of the negative phase-sequence current in said polyphase loop circuit.

4. An alternating current system comprising a polyphase loop circuit having phase conductors, a circuit adjacent said polyphase loop circuit and effective under certain conditions for inducing a substantial zero phase-sequence quantity in said polyphase loop circuit, switch means for operatively connecting and disconnecting portions of said polyphase loop circuit, and control means for operating said switch means when a ground fault occurs on one of said phase conductors, said control means including a negative phase-sequence directional relay connected for energization in accordance with the energization of said polyphase loop circuit, a negative phase-sequence overcurrent relay connected for energization in accordance with the energization of said polyphase loop circuit, a time delay relay, and means responsive only to actuation of both said directional relay and said overcurrent relay for placing said time delay relay in operative condition for energization in accordance with a zero-phase sequence quantity in said polyphase loop circuit.

5. An alternating current system comprising a polyphase circuit offering a path for zero phase-sequence current, a circuit adjacent said polyphase circuit and effective under certain conditions for inducing a substantial zero phase-sequence current in said polyphase circuit, control means including first means responsive to zero phase-sequence current in said polyphase circuit, said control means including second means responsive to the direction of flow of negative phase-sequence current in said polyphase circuit, and means responsive only when said first and second means are both in predetermined conditions for effecting a control operation.

6. An alternating current system comprising a polyphase circuit offering a path for zero phase-sequence current, a circuit adjacent said polyphase circuit and effective under certain conditions for inducing a substantial zero phase-sequence current in said polyphase circuit, control means including first means responsive to zero phase-sequence current in said polyphase circuit, said control means including second means responsive to the direction of flow of negative phase-sequence current in said polyphase circuit, and means responsive only when said first and second means are both in predetermined conditions for effecting a control operation, and means for adjusting the magnitude of the negative phase-sequence current to which said control means responds.

7. In an alternating current relay device for association with a polyphase-electrical circuit, a negative phase-sequence directional element, a negative phase-sequence overcurrent element, a zero phase-sequence overcurrent element, and control means effective for performing a control operation only when all of said elements are in predetermined conditions corresponding respectively to a predetermined direction of negative phase-sequence flow, a predetermined magnitude of negative phase sequence current and a predetermined magnitude of zero phase-sequence current in a polyphase electrical circuit with which said relay device may be associated.

ROY M. SMITH.